(12) United States Patent
Rey et al.

(10) Patent No.: US 11,499,645 B2
(45) Date of Patent: Nov. 15, 2022

(54) BALANCING VALVE (71) Applicant: Aliaxis R&D S.A.S., Vernouillet (FR)

(72) Inventors: Charlotte Rey, Chatou (FR); Jean-Phillipe Le Goff, Triel-sur-Seine (FR); Vanessa Delair, Chatou (FR); Henri-Xavier Cavalie, Pont-l'Évêque (FR); Baptiste Audrezet, Sèvremoine (FR); Stefano Costa, Genoa (IT); Alberto Castellaro, Genoa (IT); Rodolfo Zanni, Genoa (IT)

(73) Assignee: Aliaxis Research & Technology, Elancourt (FR)

( * ) Notice: Subject to any disclaimer, the term of this patent is extended or adjusted under 35 U.S.C. 154(b) by 0 days.

(21) Appl. No.: 17/290,192

(22) PCT Filed: Nov. 12, 2019

(86) PCT No.: PCT/EP2019/080986
§ 371 (c)(1),
(2) Date: Apr. 29, 2021

(87) PCT Pub. No.: WO2020/099380
PCT Pub. Date: May 22, 2020

(65) Prior Publication Data
US 2022/0018453 A1 Jan. 20, 2022

(30) Foreign Application Priority Data
Nov. 12, 2018 (LU) .................................. 100995

(51) Int. Cl.
F16K 5/10 (2006.01)
F16K 3/24 (2006.01)
(Continued)

(52) U.S. Cl.
CPC ........ *F16K 5/10* (2013.01); *F24D 2220/0264* (2013.01)

(58) Field of Classification Search
CPC ....... Y10T 137/6035; Y10T 137/87145; Y10T 137/87523; Y10T 137/8803;
(Continued)

(56) References Cited

U.S. PATENT DOCUMENTS

| 4,187,872 A | 2/1980 | Freeman |
| 4,624,281 A | 11/1986 | Vidal |
| 6,164,328 A * | 12/2000 | Huber, Jr. ............. B60T 13/406 |
| | | 137/599.17 |

FOREIGN PATENT DOCUMENTS

| CH | 188383 A | 12/1936 |
| CN | 105020425 A | 11/2015 |

(Continued)

*Primary Examiner* — Marina A Tietjen
(74) *Attorney, Agent, or Firm* — 24IP Law Group USA, PLLC; Timothy Dewitt (57) ABSTRACT

The present invention proposes a balancing valve, a fluid network with such a balancing valve, and a method of maintaining such a balancing valve. The balancing valve comprises a housing having a main fluid passage extending along a main flow axis, a valve body disposed within the housing in the fluid passage, wherein the valve body has a first through hole forming a first fluid passage with a variable first fluid passage cross section. The valve body has a second through hole distinct from the first through hole and forming a second fluid passage in the valve body. The first fluid passage is a main fluid passage and the second fluid passage is a by-pass passage.

17 Claims, 8 Drawing Sheets

(51) Int. Cl.
*F16K 3/32* (2006.01)
*F16K 5/04* (2006.01)
*F16K 5/06* (2006.01)

(58) Field of Classification Search
CPC .... Y10T 137/87378; F16K 11/12; F16K 5/10; F16K 3/246; F16K 3/314; F16K 3/32; F16K 5/0407; F16K 5/0605; F16K 37/005; F16K 43/003; F24D 2220/0264; F24D 19/1021; F24D 19/1015
See application file for complete search history.

(56) References Cited

FOREIGN PATENT DOCUMENTS

| | | | | |
|---|---|---|---|---|
| CN | 105909816 A | | 8/2016 | |
| GB | 1393181 A | | 5/1975 | |
| GB | 2153975 A | * | 8/1985 | ........... F16K 43/003 |
| GB | 2279431 A | | 1/1995 | |

* cited by examiner

Fig. 14 working position

395 / 397

Fig. 15A by pass position

BALANCING VALVE

CROSS-REFERENCE TO RELATED APPLICATIONS

This application claims priority from Luxembourg patent application number LU100995 filed on 12 Nov. 2018. The entire disclosure of Luxembourg patent application number LU100995 is hereby incorporated herein by reference.

BACKGROUND OF THE INVENTION

Field of the Invention

The present invention relates to the field of valves. More precisely, the present invention relates to a balancing valve, a hydraulic network comprising such a balancing valve and a method of maintenance of such a balancing valve.

Brief Description of the Related Art

As part of the management of hot water networks, some networks are looped. The hot water is heated and then circulated by means of a pump. The hot water travels around the building to serve the various points of use, before returning to the heating point. The flow rate of the hot water in these loops is generally managed by a valve called a balancing valve.

The balancing valve has an essential function of adjusting the water flow rate to ensure a uniform flow within the installation as well as a uniform temperature throughout the hydraulic installation.

Typically, the balancing valve is a valve with fine adjustment, in which a needle is provided to obstruct the fluid passage therein in a variable manner, thus creating a pressure drop to limit the flow of water. Usually, the needle is made of metal in a valve body mainly made of brass.

In those installations, the flow of fluid can lead to particles deposition on the needle or in the fluid passage, which over time can result in a misfunctioning of the balancing valve or can even clog the balancing valve. Therefore, it would be advantageous to be able to clean balancing valves regularly, in order to increase their lifetime.

Further, it is important to ensure a continuous flow of hot water even during operations of cleaning, maintenance or repair on the balancing valve. Therefore, a by-pass system comprising a pipe and fittings upstream and downstream of the balancing valve is also provided. Whenever cleaning or maintenance operations are required, the flow of water is directed to the by-pass system, so that the balancing valve may be removed for cleaning/maintenance or repair without interruption of the water flow.

However, such installations with a by-pass system to be added are expensive by increasing the number of valves used and the complexity of the network.

It is an object of the present invention to overcome the prior art drawbacks.

In particular, it is an object of the present invention to provide a balancing valve easy to be manufactured. It is also an object of the present invention to provide a valve for managing locally the flow rate of a fluid. It is also an object of the present invention to provide a balancing valve easy to be maintained without adding complexity to the existing network.

SUMMARY OF THE INVENTION

These and other objects of the present invention are achieved by the present invention as described herein.

According the invention, the balancing valve comprises a housing having a main fluid passage extending along a main flow axis, a valve body disposed within the housing in the fluid passage, wherein the valve body has a first through hole forming a first fluid passage with a variable first fluid passage cross section, and wherein the valve body has a second through hole distinct from the first through hole and forming a second fluid passage in the valve body, wherein the first fluid passage is a main fluid passage and the second fluid passage is a by-pass passage.

With other words, the present invention proposes having not only the main fluid passage but also a by-pass passage within the valve body. This allows providing a by-pass system provided within the balancing valve itself. This advantage avoids the use of additional by-pass system. Indeed, when the valve is operated in the bypass mode the main fluid passage can be disconnected from pressure present in the network and thus maintenance can be performed with respect to the main fluid passage.

In one aspect of the invention, the valve body is movably mounted to the housing to select one of the first through hole and of the second through hole for the fluid flow. Therefore, it becomes possible to choose between a position in which the balancing valve is provided for managing the fluid flow, and a by-pass position in which the balancing valve is provided for ensuring a minimum flow for maintenance or cleaning.

In an aspect of the invention, the balancing is ensured by providing a variable first fluid passage cross section which is adjustable by a control element inserted within the valve body and into the first through hole and whose position within the first through hole can be adjusted.

In one aspect, the control element can be removed from the valve body when the balancing valve is in the by-pass position, without interruption of the fluid flow. This allows for cleaning or maintaining operation without interruption of service and without having to provide additional by-pass systems.

Preferably the removal is governed by a security system. In one example the security system is such that the removal of the control element is inhibited unless the balancing valve is set to the bypass position.

Advantageously the balancing valve is blocked in the bypass position when the control element is not properly installed or reinstalled after maintenance or cleaning. In a particularly preferred embodiment, a leaking port is provided, such that upon removal of the control element, the remaining pressure in the main fluid passage, disconnected from the network as the valve is in bypass position, can be decreased in a controlled or at least in a slow and safe manner.

In a further aspect of the present invention, the valve body is rotatably mounted to the housing, between a working position in which the first through hole extends along the main flow axis, and a by-pass position in which the second through hole extends along the main flow axis, in particular wherein the first through hole and the second through hole are orthogonal one with respect to the other. With such a rotational movement, it becomes easy for a user to operate the balancing valve and select the desired position. The valve may be equipped with a locking system to allow, e.g., to install a lock to hinder any inadvertent moving of the balancing valve.

The valve body may comprise one of a ball and a cylindrical body, and the control element may comprise a needle inserted into the ball or the cylindrical body and movable in a radial direction to obstruct in an adjustable manner the first through hole.

In another aspect, the valve body comprises a first jaw with an first outer surface and a second jaw with a second outer surface, the first through hole being formed between the first outer surface and the second outer surface, with a distance between the first outer surface of the first jaw and the second outer surface of the second jaw being adjustable in a radial direction to modify first fluid passage cross section, in particular the first jaw is fixedly mounted to the valve body and the second jaw is movable in a radial direction as part of the control element.

The first outer surface and second outer surface may have a cross section with complementary saw tooth profiles in along the main flow axis when the valve body is in a working position.

In an aspect, the valve body is provided with a by-pass knob to rotate the valve body, and a balancing control knob for adjusting a cross section of the first through hole, in particular wherein the by-pass knob is located below the valve body and the balancing control knob is located above the valve body when the balancing valve is installed in a network.

By providing a housing with a first sensor aperture upstream of the valve body and a second sensor aperture downstream of the valve body, for providing access to pressure or flow rate sensor and measure the pressure or flow rate upstream and downstream of the valve body, in use, one can adjust the balancing valve to manage the fluid rate depending on the requirements. The adjustment may further be automated.

In an aspect, the balancing valve is configured such that the valve body can be turned by 180 degrees in order to change the direction of fluid flowing through the main fluid passage (first trough hole). The choice should be made at the time of installing the balancing valve in the hydraulic network, for example depending on spatial constraints and on the hydraulic network. A rotation of 180° C. of the valve body when the balancing valve is installed and in operation would not change the direction of fluid flowing through the main fluid passage.

Preferably the balancing valve is configured such that the rotation of valve body is restricted to allow the passage from the main fluid passage to the bypass passage, only. In case of combining the two above features a rotation limiting part can be provided removably, and preferably configured to allow for indication of the flow direction through the main fluid passage.

In another aspect of the present invention, the valve body and/or the control element is/are made of polymer.

The present invention also proposes a hydraulic network comprising a first pipe element, a second pipe element and a balancing valve as described above, the balancing valve being installed between the first pipe element and the second pipe element extending along a main flow axis, wherein the balancing valve can be rotated between a working position in which the first through hole extends along the main flow axis, and a by-pass position in which the second through hole extends along the main flow axis.

The present invention further proposes a method of maintaining a balancing valve installed in a hydraulic network, the hydraulic network comprising a first pipe element, a second pipe element and a balancing valve, the balancing valve being disposed between the first pipe element and the second pipe element along a main flow axis, the method comprising rotating the balancing valve from a working position in which the first through hole extends along the main flow axis, to a by-pass position in which the second through hole extends along the main flow axis. Preferably the rotation of the valve body is limited such as to allow the change between the working position and the by-pass position, and even more preferably either position is lockable by means of any suitable locking means, such as a lock to be inserted into two holes provided in the movable part and the non-movable part.

In an aspect, the method comprises removing the control element from the valve body for maintenance or cleaning, without interrupting the fluid flow through the hydraulic network. Preferably the removing of the control element is inhibited unless the valve body is in the bypass position and/or the bypass position is blocked unless the control element is properly installed and in position for sealing the main passage such that the risk for injuries due to escaping hot water can be reduced.

Still other aspects, features, and advantages of the present invention are readily apparent from the following detailed description, simply by illustrating a preferable embodiments and implementations. The present invention is also capable of other and different embodiments and its several details can be modified in various obvious aspects, all without departing from the scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

DESCRIPTION OF THE DRAWINGS

The invention is described hereinafter with reference to the enclosed drawings, in which.

DETAILED DESCRIPTION

FIGS. 1 to 4 illustrate a balancing valve 1 according to a first aspect of the present disclosure.

Figure 1:
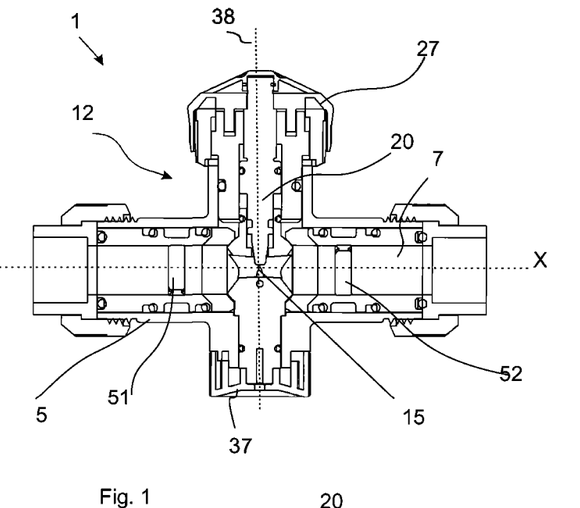
FIG. 1 is a balancing valve according to a first aspect of the present disclosure.

The balancing valve 1 comprises a housing 5 having a main fluid passage 7 extending along a main flow axis X.

A valve body 12 is disposed within the housing 5 in the fluid passage 7.

The valve body 12 has a first through hole 15 forming a first fluid passage. The first through hole 15 has a variable cross section.

In the first embodiment, the valve body 12 is of a ball type and a control pin or needle 20 is inserted into the valve body 12 and is configured to partially obstruct the through hole 15, in a variable manner, thereby varying the first fluid passage cross section. The skilled person knowns that the first through hole 15 cannot be closed completely and even when obstructed at the maximum, there remains always a minimum aperture required to ensure the minimum fluid flow rate when the balancing valve is installed in a network.

The needle 20 is movable radially, to adjust the first fluid passage cross section and hence the pressure drop inside the balancing valve 1, as known in the art. The needle 20 is therefore a control element which can adjust a cross section of the first fluid passage.

A balancing control knob 27 is provided at one end of the needle 20 to adjust the position of the needle 20 within the valve body 12.

The valve body 12 comprises a second through hole 35 forming a second fluid passage, distinct from the first through hole 15. The second through hole 35 is preferably oriented transversely to the first through hole 15.

The second through hole 35 has a specific diameter which is designed to allow to reach the same flow as the one obtained with the first through hole 15 closed at its maximum. The second through hole 35 is intended to form, in use, a by-pass channel.

Figure 2:
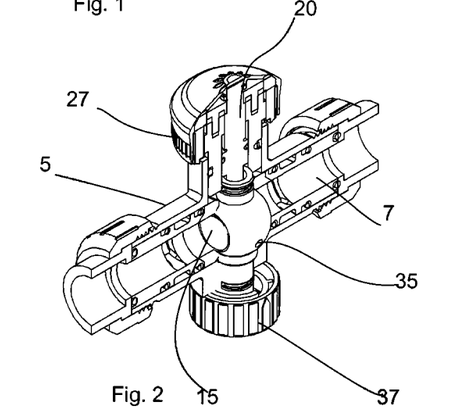
FIG. 2 is the balancing valve of FIG. 1, in a working position of the balancing valve, according to the present disclosure.
Figure 3:
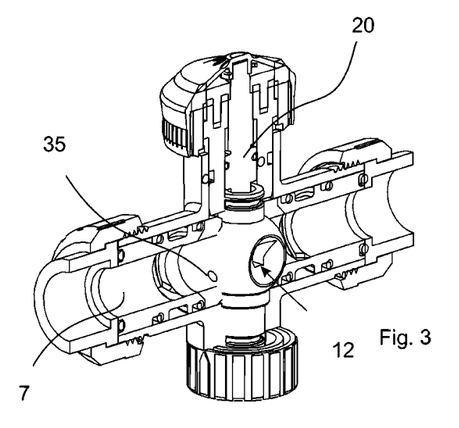
FIG. 3 is the balancing valve of FIG. 1, in a by-pass position of the balancing valve, according to the present disclosure.

The valve body 12 is rotatably mounted to the housing 5, around a rotation axis 38, between a working position in which the first through hole 15 extends along the main flow axis, and a by-pass position in which the second through hole 35 extends along the main flow axis, as illustrated in FIG. 2 (working position) and FIG. 3 (by-pass position).

The second through hole 35 is positioned below the first through hole 15, in the working and bypass positions of the balancing valve 1.

The rotation axis 38 is preferably perpendicular to the main flow axis X. The needle 20 is also preferably aligned with the rotation axis 38. The angle between the by-pass channel 35 and the main fluid passage 15 is preferably 90 degrees. An angle of 90 degrees is easy to provide and is easy for a user. Of course, this is not limiting the invention and other angles and orientations and rotation axis can be provided.

Positioning means and stopping means can be provided to control the rotation and positioning of the valve body within the housing.

A by-pass knob 37 is provided for rotating the valve body 12 around said rotation axis 38.

The by-pass knob 37 is positioned opposite the balancing control knob 27 with respect to the valve body 12. In particular, the by-pass knob 37 is located one side of the valve body, preferably below the valve body 12, and the balancing control knob 27 is located on the other opposite side of the valve body, preferably above the valve body, when the balancing valve is installed in a network.

The valve body and the needle are made of polymer, instead of metal in the prior art.

In operation, the fluid is directed to flow through the first through hole 15 and the pressure drop is controlled via by rotating the needle 20 of the balancing valve 1 to adjust the cross section of the first through hole. The pressure can be measured by pressure sensors. To do so, the housing 5 comprises a first sensor aperture 51 upstream of the valve body 12 and a second sensor aperture 52 downstream of the valve body 12, for providing access to pressure or flow rate sensor and measure the pressure or flow rate upstream and downstream of the valve body, and hence the pressure drop, when the balancing valve is installed in a fluid network.

This adjustment of the control element position can be automated.

Whenever cleaning or maintenance operations are needed, the fluid can be directed to flow through the second trough hole 35 by rotating the knob 37 about the rotation axis 38, to align the second through hole 35 along the main flow axis X. The second through hole 35 therefore forms a by-pass channel.

Figure 4:
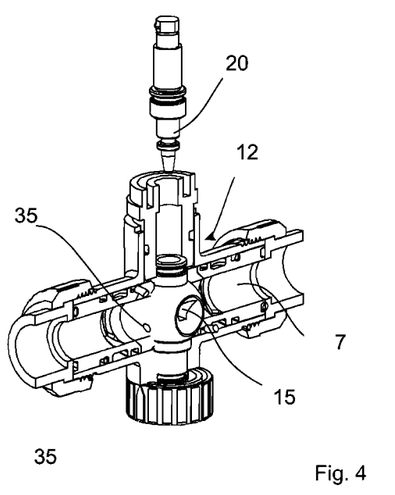
FIG. 4 shows the balancing valve of FIG. 1 during maintenance.

As illustrated on FIG. 4, when the second through hole 35 is aligned along the main flow axis, so that fluid can flow through the second through hole 35, the needle 20 can be removed from the valve body 12 and completely exit the balancing valve 1 to be cleaned, without any interruption of service.

FIG. 5 to FIG. 8 illustrate a balancing valve 201 according to a second embodiment of the present invention.

Figure 5:
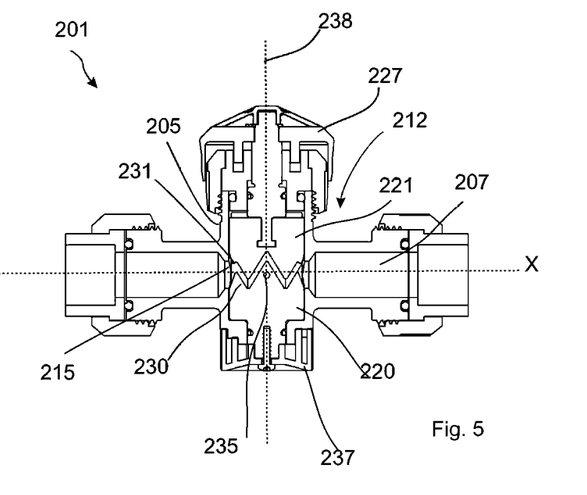
FIG. 5 is a balancing valve according to another aspect of the present disclosure.

The balancing valve 201 comprises a housing 205 having a main fluid passage 207 extending along a main flow axis X.

A valve body 212 is disposed within the housing 205 in the fluid passage 207.

The valve body 212 comprises a first jaw 220 and a second jaw 221, cooperating with the first jaw 220 to form a first through hole or first fluid passage 215 therebetween. In particular, the first jaw 220 has a first outer surface 230 and the second jaw 221 has a second outer surface 231, the first through hole being formed between the first outer surface 230 and the second outer surface 231. A distance between the first outer surface 230 and the second outer surface 231 is adjustable in a radial direction to modify a first fluid passage cross section.

In the example of FIGS. 5 to 8, the first jaw 220 is fixedly mounted and the second jaw 221 is movable radially with respect to the fluid passage, preferably vertically when/if the fluid passage is horizontal when the balancing valve is installed into a fluid network, to adjust said first fluid passage cross section, and hence the pressure drop inside the balancing valve 201.

Figure 6:
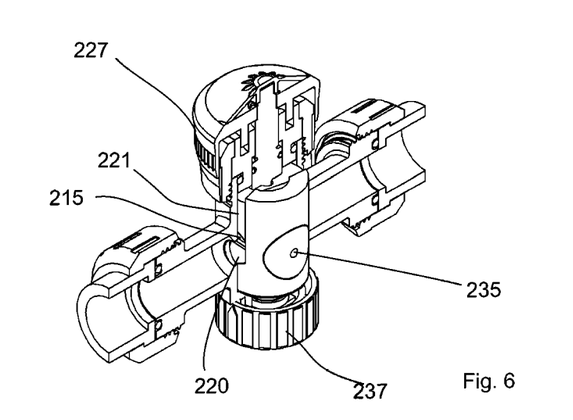
FIG. 6 is the balancing valve of FIG. 5 in a working position of the balancing valve, according to the present disclosure.

The first outer surface 221 and second outer surface 231 have a cross section with complementary saw tooth profiles in along the main flow axis X when the valve body 212 is in a working position.

A control knob 227 is provided at one end of second jaw 221 to adjust the position of the second jaw 221 within the valve body 212.

The valve body 212 comprises a second through hole 235 distinct from the first through hole 215.

The second through hole 235 is preferably oriented transversely to the through hole 215, and below the first through hole 215, in operative position of the balancing valve 201.

Figure 7:
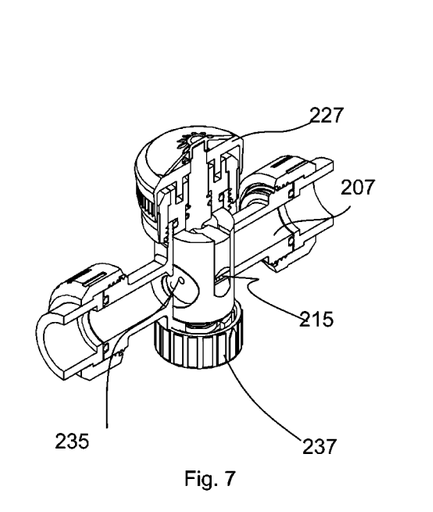
FIG. 7 is the balancing valve of FIG. 5 in a by-pass position of the balancing valve, according to the present disclosure.
Figure 8:
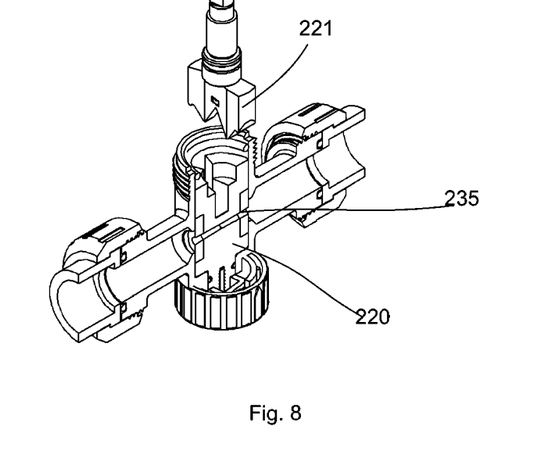
FIG. 8 shows the balancing valve of FIG. 5 during maintenance.

The valve body 212 is rotatably mounted to the housing 205, around a rotation axis 238, between a working position in which the first through hole 215 extends along the main flow axis X, and a by-pass position in which the second through hole 235 extends along the main flow axis X, as illustrated in FIG. 6 (working position) and FIG. 7 (by-pass position).

The rotation axis 238 is preferably perpendicular to the main flow axis X.

An angle between the first through hole 215 and the second through hole 235 is preferably 90 degrees. An angle of 90 degrees is easy to provide and is easy for a user. Of course, this is not limiting the invention and other angles and orientations and rotation axis can be provided.

Positioning means and stopping means can be provided to control the rotation and positioning of the valve body within the housing.

A by-pass knob 237 is provided for rotating the valve body 212 around said rotation axis 238.

In the example shown on the figures, the by-pass knob 237 is on one side of the valve body 212, opposite to the control knob 227.

The fluid through the balancing valve can be directed to flow either through the first through hole 215 or through the second through hole 235. In particular, when cleaning or maintenance operation need to be performed, a user can rotate the knob 237 about the rotation axis 238, to align the second through hole 235 along the main flow axis X. The second through hole 235 therefore forms a by-pass channel. As illustrated on FIG. 8, when the second through hole 235 is aligned along the main flow axis X, fluid can flow through the second through hole 235, and the second jaw 221 can be removed from the valve body 212 and completely exit the balancing valve 201. This allows operations of maintenance or cleaning without any interruption of service.

A by-pass knob 237 is provided for rotating the valve body 212 around a rotation axis 238.

The by-pass channel 235 diameter cannot be adjusted in this example. This is not limiting the invention.

The geometrical shape of the control element is specific to control the pressure drop.

FIGS. 9 to 15 illustrate a balancing valve 301 according to an aspect of the present disclosure.

Figure 9:
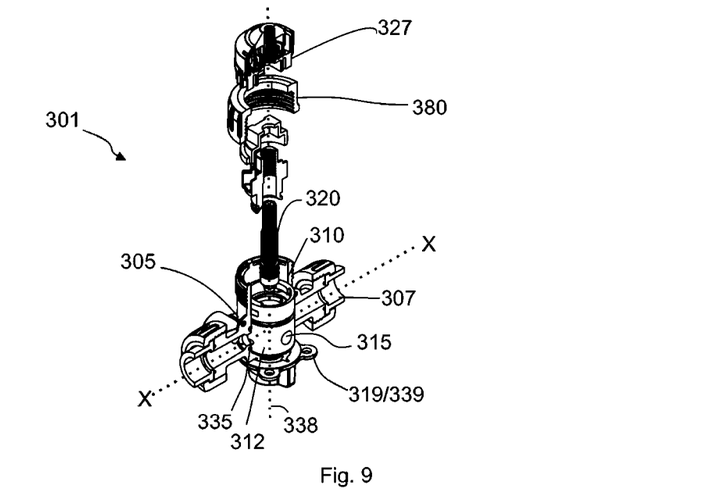
FIG. 9 shows an exploded view of a balancing valve according to another aspect of the present disclosure.

The balancing valve 301 comprises a housing 305 having a main fluid passage 307 extending along a main flow axis X.

A valve body 312 is disposed within the housing 305 in the fluid passage 307.

The valve body 312 has a first through hole 315 forming a first fluid passage. The valve body 312 comprises a second through hole 335 forming a second fluid passage, distinct from the first through hole 315. The second through hole 335 is preferably oriented transversely to the first through hole 315.

The first through hole 315 has a variable cross section. In this embodiment, the valve body 312 is of cylindrical type and a control element 320, in the form of a pin or needle, is inserted into the valve body 312 and is configured to partially obstruct the first through hole 315, in a variable manner, thereby varying the first fluid passage cross section.

A balancing control knob 327 is provided at one end of the needle 320 to adjust the position of the needle 320 within the valve body 312.

The balancing control knob 327 may be rotated by using a tool such as a hexagon socket wrench or an Allen key positioned on the balancing control knob 327. Visual indicator window 328 may be provided to help position the needle 320 within the valve body 312. It should be noted that the control knob 227 of the valve body of FIG. 5 or the control knob 227 of the valve body of FIG. 1 may also be rotated using a tool such as a hexagon socket wrench or an Allen key positioned on the balancing control knob 327, possibly with visual indicator window.

The needle 320 is movable, to adjust the first fluid passage cross section and hence the pressure drop inside the balancing valve 301, as known in the art. The needle 320 is therefore a control element which can adjust a cross section of the first fluid passage.

Similarly, to the balancing valves of FIGS. 1 and 5, in operation, the fluid is directed to flow through the first through hole 315 and the pressure drop is controlled via by rotating the needle 320 of the balancing valve 301 to adjust the cross section of the first through hole. The pressure can be measured by pressure sensors. To do so, the housing 5 comprises a first sensor aperture 351 upstream of the valve body 312 and a second sensor aperture 352 downstream of the valve body 312, for providing access to pressure or flow rate sensor and measure the pressure or flow rate upstream and downstream of the valve body, and hence the pressure drop, when the balancing valve is installed in a fluid network. Hence, the pressure drop can be measured by placing an inlet pressure sensor 321 and outlet pressure sensor 328, to derive said pressure drop. This allows the user, using graphs provided by the manufacturer, to know the flow rate through the valve. The pressure sensors can be two standardized brass pressure taps used to measure the valve pressure delta.

It should be noted that the first through hole 315 cannot be closed completely and even when obstructed at the maximum, there remains always a minimum aperture required to ensure the minimum fluid flow rate when the balancing valve is installed in a network. For example, a minimum residual flow rate can be found in the norm NF DTU 60.11 P1/2.

The second through hole 335 has a diameter allowing it to respect a minimum residual flow rate, as recommended/needed. For example, a minimum residual flow rate can be found in the norm NF DTU 60.11 P1/2. With other words, the second through hole 335 has a specific diameter which is designed to allow to reach the same flow as the one obtained with the first through hole 315 closed at its maximum. The second through hole 335 is intended to form, in use, a by-pass channel.

The second through hole 335 is positioned below the first through hole 315, in operative position of the balancing valve 301. As previously described the first through hole 315 and the second through hole 335 are angularly offset, preferably by 90 degrees when viewed in a plan view.

Figure 10:
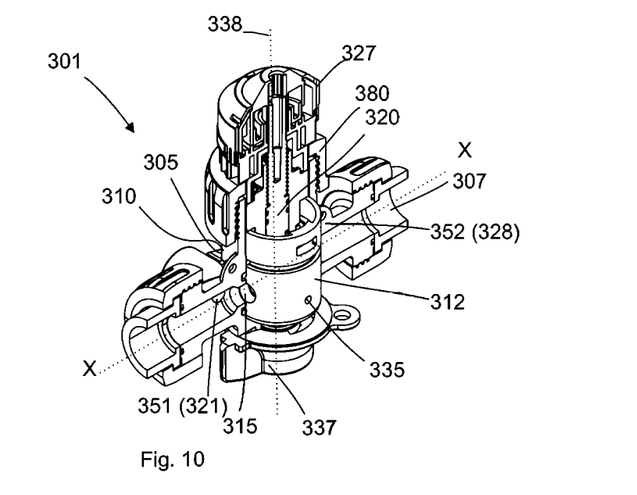
FIG. 10 is the balancing valve of FIG. 9 in a working position of the balancing valve, according to the present disclosure.
Figure 11:
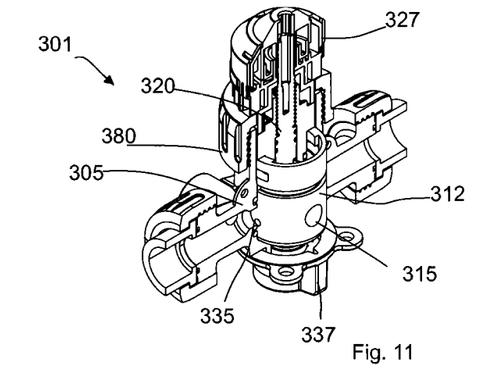
FIG. 11 is the balancing valve of FIG. 9 in a by-pass position of the balancing valve, according to the present disclosure.

The valve body 312 is rotatably mounted to the housing 305, around a rotation axis 338, between a working position in which the first through hole 315 extends along the main flow axis, and a by-pass position in which the second through hole 335 extends along the main flow axis, as illustrated in FIG. 10 (working position) and FIG. 11 (by-pass position).

The rotation axis 338 is preferably perpendicular to the main flow axis X. The needle 320 is also preferably aligned with the rotation axis 338. The angle between the by-pass channel 335 and the main fluid passage 315 is preferably 90 degrees. An angle of 90 degrees is easy to provide and is easy for a user. Of course, this is not limiting the invention and other angles and orientations and rotation axis can be provided.

A by-pass knob 337 is provided for rotating the valve body 312 around said rotation axis 338.

The by-pass knob 337 is therefore used to position the valve body in said working position or in said by-pass position. This can be seen in FIGS. 15A-15C which shows different views of the balancing valve in the working position (left side) and in the by-pass position (right side).

The by-pass knob 337 is positioned opposite the balancing control knob 327 with respect to the valve body 312. In particular, the by-pass knob 337 is located one side of the valve body, preferably below the valve body 312, and the balancing control knob 327 is located on the other opposite side of the valve body, preferably above the valve body, when the balancing valve is installed in a network.

Visual indicators can be provided on the by-pass knob 337, to let a user know in which position the by-pass knob 337, and hence the valve body, is. In one example, two indicators with the wording "by" and "pass" are provided, which are aligned when the bypass knob 337 has been rotated to bring the bypass knob 337, and hence the valve body, in the bypass position.

The by-pass knob 337 may be provided with locking eyelets 339, and the valve body may be provided with body eyelets 319. Regardless of the operating mode activated, it is possible to lock the position of the by-pass knob 337, and hence of the balancing valve 301, by passing a padlock through two eyelets. The by-pass knob cannot be rotated.

The use of the valve is therefore safe.

Figure 15A:
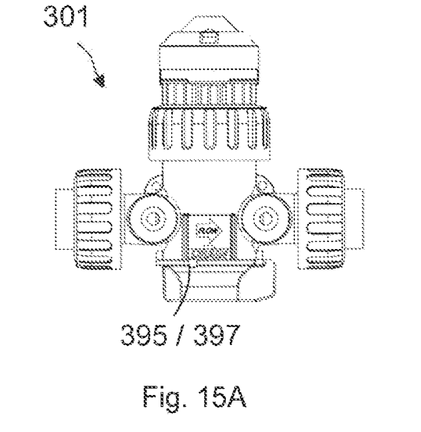
Figure 15B:
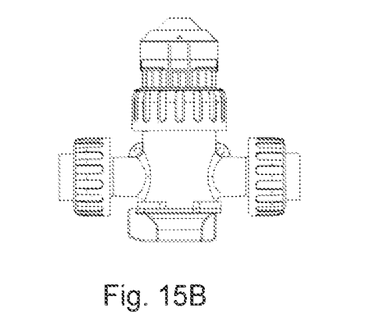
Figure 15C:
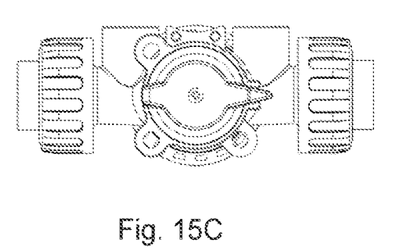

Positioning means and stopping means can be provided to control the rotation and positioning of the valve body 312 within the housing 305. In particular, as will be explained later with reference to FIG. 15, it is possible to change the direction of the flow within the balancing valve when the balancing valve is installed or being installed in a network, by rotating the valve body of 180° around the rotation axis 338 within the housing 305, thereby allowing to adapt the direction of the flow in the balancing valve.

In operation, the fluid is directed to flow through the first through hole 315 and the pressure drop is controlled via by rotating the needle 320 of the balancing valve 301 to adjust the cross section of the first through hole. The pressure can be measured by pressure sensors. To do so, the housing 305 comprises a first sensor aperture 351 upstream of the valve body 312 and a second sensor aperture 352 downstream of the valve body 312, for providing access to pressure or flow rate sensor and measure the pressure or flow rate upstream and downstream of the valve body, and hence the pressure drop, when the balancing valve is installed in a fluid network.

This adjustment of the control element position can be automated.

Whenever cleaning or maintenance operations are needed, the fluid can be directed to flow through the second trough hole 335 by rotating the knob 337 about the rotation axis 338, to align the second through hole 335 along the main flow axis X. The second through hole 335 therefore forms a by-pass channel. Preferably the rotation is limited by corresponding.

When the second through hole 335 is aligned along the main flow axis X, so that fluid can flow through the second through hole 335, the needle 320 can be removed from the valve body 312 and completely exit the balancing valve 301 to be cleaned, without any interruption of service. In a particularly preferred embodiment, the removal can only intervene in the above alignment position, and even more preferably the quitting of the alignment position is only possible after the serviced or replaced needle has be installed again.

To do so, an opening knob or nut 380 is unscrewed to allow the needle 320 to be removed from the housing and the cleaning of the balancing valve 320.

A leaking port can be provided, such that upon removal of the control element, the remaining pressure in the main fluid passage, disconnected from the network as the valve is in bypass position, can be decreased in a controlled or at least in a slow and safe manner.

Figure 13:
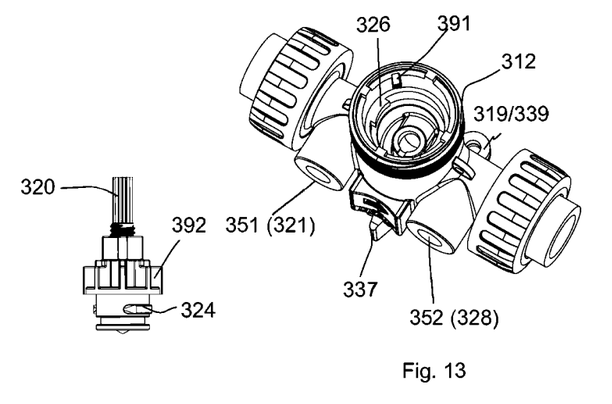

A locking device 324, 326 is provided to prevent removing of needle 320 when the balancing valve 301 is in working position (FIG. 13).

In this embodiment, the locking device comprises needle stops 324 at the lower end of the needle 320, which are arranged to cooperate with two corresponding housing stops 326 fixed the valve body 312. The housing stops 326 may be provided on the valve body 312 or on a fixed part of the control element designed to be fixed to the valve body 312 and to which the needle 320 can be assembled. (see FIGS. 13 and 14).

Figure 14:
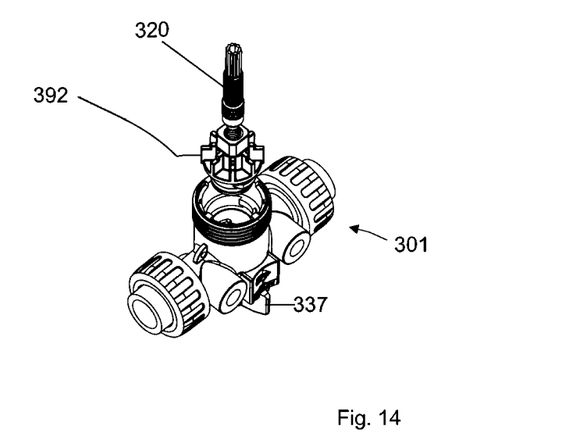

Preferably there are two needle stops adapted to cooperate with two housing stops 326. This is an example only. The two needle stops are diametrically opposed.

When the valve body 312 is in the working position in which the first through hole 315 extends along the main flow axis, the needle stops 324 are located below the housing stops 326, preventing the removal of the needle 320 from the valve body 312.

When the valve body 312 is in the bypass position in which the second through hole 335 extends along the main flow axis, the needle stops 324 are located at 90° away from the housing stops 326, allowing removal of the needle 320 from the valve body 312.

Figure 12:
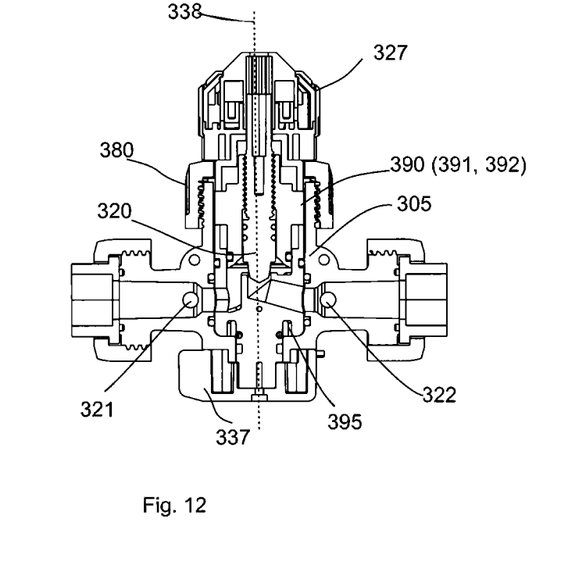
FIG. 12 shows a view of the balancing valve of FIG. 9, FIGS. 13 and 14 show details of the balancing valve of FIG. 9, FIGS. 15A-C show different views of the balancing valve of FIG. 9 in a working position according to another aspect of the present disclosure.

The balancing valve 301 is further provided with positioning means 390 to help reassemble the control element 320 after cleaning (FIG. 12 to FIG. 14). The housing has opposed L grooves 391 on its inner side of the valve body 312, preferably two grooves, which are designed to cooperate with corresponding ribs 392 on the positioning means 390. When reassembling the needle 320 with the valve body or with the fixed part mounted to the valve body, the positioning ribs must be engaged in the corresponding grooves. Thus, the orientation between the two parts is maintained. It should be noted that the number of positioning grooves and positioning ribs is given as a non-limiting example. Similarly, the ribs may be located on the removable part whereas the grooves may be positioned on the housing. Ribs and grooves are given as example and any cooperating positioning parts may be contemplated as well.

Therefore, contrarily to the prior art balancing valves which do not offer options to disassemble the valve while the valve is installed on the water network, the balancing valve of the present invention can be dismantled and cleaned in service thanks to the use of a by-pass. This has the advantage of extending the lifespan of the balancing valve and ensuring a better water quality in the network.

It should be noted that the locking device and positioning means have been described in detail with reference to the embodiment of FIGS. 9-15. The balancing valve of the first and second embodiments may be provided with such a locking device preventing removal of the needle or of the jaw when the valve body is the working position. Similarly, positioning means are provided as well on the balancing valves of the first and second embodiments.

In another aspect of the invention, the balancing valve 301 may be installed in any working direction, allowing it to adapt the positioning of the balancing valve in the working environment and network where the balancing valve has to be installed.

The bypass knob 337 has an asymmetrical orientation control element 395 that rotates 180° to render symmetrical in order to choose the installation direction (FIG. 15).

The asymmetrical orientation control element 395 cooperates with a removable bypass stop device 397 provided with an orientation pin to block the symmetrical orientation control element in a chosen orientation of the flow, and with a stop pin to stop the by-pass knob in the bypass position.

Figure 16A:
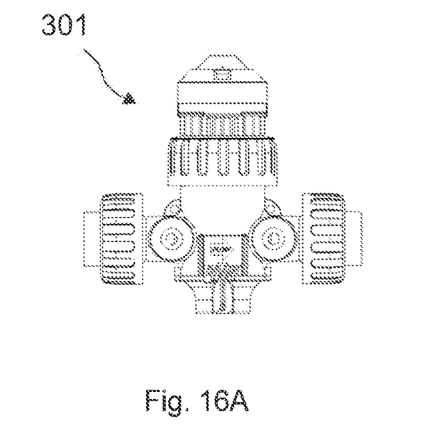
FIGS. 16A-C show different views of the balancing valve of FIG. 9 in a pass position according to another aspect of the present disclosure.
Figure 16B:
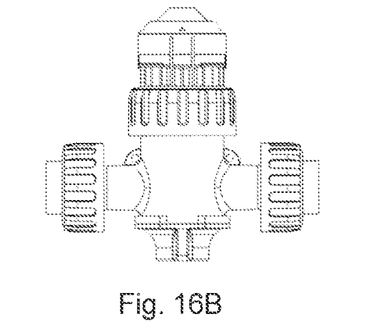
Figure 16C:
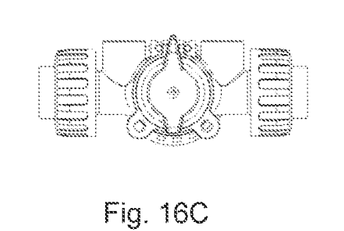

In order to reverse the direction, the user unclip the removable bypass stop device 397 and then turn the bypass knob 337 of an angle of 180° about the rotation axis 338 to reverse the direction of the flow. Finally, the user must reverse the direction of said removable bypass stop device 397 and reconnect the removable orientation stop device 397 on the asymmetrical orientation control element 395 (FIGS. 16A-16C). The skilled person understands that, one reconnected, the stop pin 395 is on the other mirror side with respect to a plan having the rotation axis 338 and perpendicular to the plane of the figures, i.e., on the right side instead of the left side as currently shown on FIGS. 16A-16C)

The stop pin 395 is longer that the orientation pin (not visible on FIG. 15 when the element is clipped in). The stop pin 395 can be used to stop bypass knob 337 when the user wishes to switch from normal working position to the bypass position. Thus, it will not be possible to rotate the bypass knob 337 more than 90° when the removable bypass stop device 397 is clipped in.

The valve body and/or the needle are made of polymer, instead of metal in the prior art.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

The invention claimed is:

1. A balancing valve comprising:
   a housing having a main fluid passage extending along a main flow axis;
   a valve body disposed within the housing in the fluid passage, wherein the valve body has a first through hole forming a first fluid passage with a variable first fluid passage cross section;
   and wherein the valve body has a second through hole distinct from the first through hole and forming a second fluid passage in the valve body;
   wherein the first fluid passage is a main fluid passage and the second fluid passage is a by-pass passage;
   wherein the valve body is movably mounted to the housing to select one of the first though hole and of the second through hole, between a working position in which the first through hole extends along the main flow axis, and a by-pass position in which the second through hole extends along the main flow axis; and
   the balancing valve comprises a control element, wherein the variable first fluid passage cross section is adjustable by said control element inserted within the valve body, wherein the control element can be removed from the valve body when the balancing valve is in the by-pass position;
   wherein the valve body is provided with a by-pass knob to rotate the valve body, and a balancing control knob for adjusting a cross section of the first through hole;
   wherein the bypass knob has an asymmetrical orientation control element adapted to rotate for changing the direction of flow in the balancing valve, and
   wherein the asymmetrical orientation control element is adapted to cooperate with a removable bypass stop device provided with an orientation pin to block the asymmetrical orientation control element in a chosen orientation of the flow, and with a stop pin to stop the by-pass knob in the by-pass position.

2. The balancing valve according to claim 1, wherein the balancing valve is designed to block the first through-hole of the balancing valve and/or the removal of the control element from the valve body when the balancing valve is in the working position, wherein the control element can be removed from the valve body only when the balancing valve is in the by-pass position.

3. The balancing valve according to claim 1, wherein the variable first fluid passage cross section is adjustable by said control element inserted within the valve body and into the first though hole and whose position within the first through hole can be adjusted.

4. The balancing valve according to claim 1, comprising a locking device to lock the control element into the valve body when the balancing valve is in the working position and to allow the removal of the control element from the valve body when the balancing valve is in the by-pass position,
   wherein the locking element comprises needle stops at a lower end of the control element which are arranged to cooperate with corresponding housing stops attached or fixed to the valve body.

5. The balancing valve according to claim 1, further comprising positioning means to help reassemble the control element after removal, wherein opposed grooves on the housing designed to cooperate with corresponding ribs on the valve body.

6. The balancing valve according to claim 1, wherein the valve body is rotatably mounted to the housing, and the first through hole and the second through hole being orthogonal one with respect to the other.

7. The balancing valve according to claim 1, wherein the valve body comprises one of a ball or a cylindrical body, and the control element comprises a needle inserted into the ball or the cylindrical body and movable in a radial direction to obstruct in an adjustable manner the first through hole.

8. The balancing valve according to claim 1, wherein the housing comprises a first sensor aperture upstream of the valve body and a second sensor aperture downstream of the valve body, for providing access to a pressure or flow rate sensor and measure the pressure or flow rate upstream and downstream of the valve body, in use.

9. The balancing valve according to claim 1, wherein the valve body and/or the control element are made of polymer.

10. A hydraulic network comprising: a first pipe element, a second pipe element and a balancing valve according to claim 1, the balancing valve being installed between the first pipe element and the second pipe element extending along a main flow axis, wherein the balancing valve can be rotated between a working position in which the first through hole extends along the main flow axis, and a by-pass position in which the second through hole extends along the main flow axis.

11. A method of maintaining a balancing valve installed in a hydraulic network, the hydraulic network comprising a first pipe element, a second pipe element and a balancing valve according to claim 1, the balancing valve being disposed between the first pipe element and the second pipe element along a main flow axis, wherein the balancing valve can be rotated from a working position in which the first through hole extends along the main flow axis, to a by-pass position in which the second through hole extends along the main flow axis, the method comprising removing the control element from the valve body for maintenance or cleaning, without interrupting the fluid flow through the hydraulic network.

12. The method according to claim 11, comprising rotating the valve body in the bypass position to allow removal of the control element for maintenance or cleaning, and comprising the steps of repositioning the control element after maintenance or cleaning, without interrupting the fluid flow through the hydraulic network, wherein rotating the balancing valve from the bypass position to the working position once the control element is installed again into the valve body.

13. A balancing valve comprising:
a housing having a main fluid passage extending along a main flow axis;
a valve body disposed within the housing in the fluid passage, wherein the valve body has a first through hole forming a first fluid passage with a variable first fluid passage cross section;
and wherein the valve body has a second through hole distinct from the first through hole and forming a second fluid passage in the valve body;
wherein the first fluid passage is a main fluid passage and the second fluid passage is a by-pass passage;
wherein the valve body is movably mounted to the housing to select one of the first though hole and of the second through hole, between a working position in which the first through hole extends along the main flow axis, and a by-pass position in which the second through hole extends along the main flow axis; and
the balancing valve comprises a control element, wherein the variable first fluid passage cross section is adjustable by said control element inserted within the valve body, wherein the control element can be removed from the valve body when the balancing valve is in the by-pass position;
wherein the valve body comprises a first jaw with an first outer surface and a second jaw with a second outer surface, the first through hole being formed between the first outer surface and the second outer surface, with a distance between the first outer surface of the first jaw and the second outer surface of the second jaw being adjustable in a radial direction to modify first fluid passage cross section, wherein the first jaw is fixedly mounted to the valve body and the second jaw is movable in a radial direction as part of the control element.

14. The balancing valve according to claim 13, wherein the first outer surface and second outer surface have a cross section with complementary saw tooth profiles in along the main flow axis when the valve body is in a working position.

15. The balancing valve according to claim 13, wherein the valve body is provided with a by-pass knob to rotate the valve body, and a balancing control knob for adjusting a cross section of the first through hole, in particular wherein the by-pass knob is located below the valve body and the balancing control knob is located above the valve body when the balancing valve is installed in a network.

16. The balancing valve according to claim 15, wherein the bypass knob has an asymmetrical orientation control element adapted to rotate for changing the direction of flow in the balancing valve.

17. The balancing valve according to claim 16, wherein the asymmetrical orientation control element adapted to cooperate with a removable bypass stop device provided with an orientation pin to block the symmetrical orientation control element in a chosen orientation of the flow, and with a stop pin to stop the by-pass knob in the by-pass position.

* * * * *